No. 868,939. PATENTED OCT. 22, 1907.
H. C. REAMES.
PNEUMATIC PUMP.
APPLICATION FILED SEPT. 20, 1906.
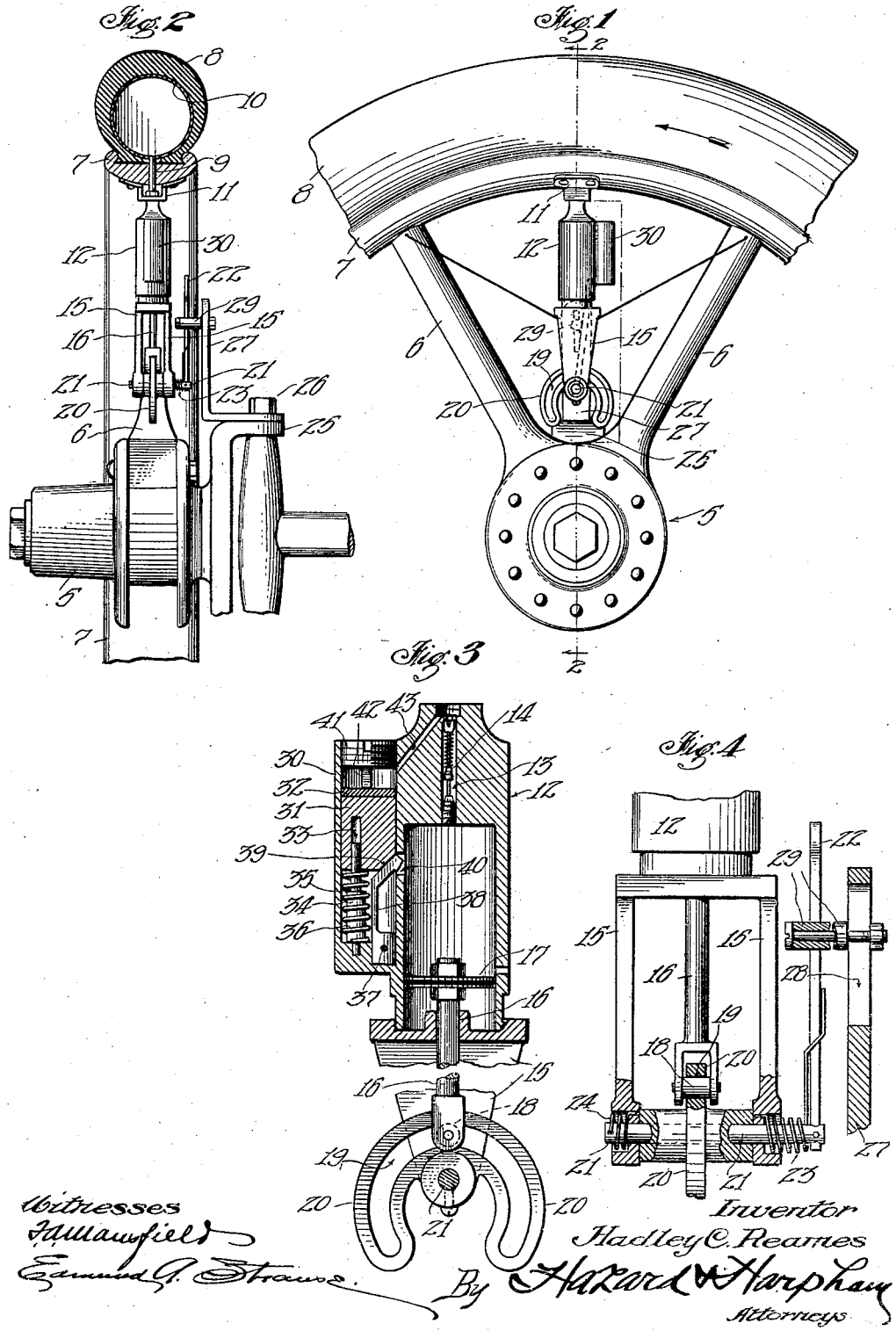
Witnesses
Inventor
Hadley C. Reames
By Hazard & Harpham
Attorneys

UNITED STATES PATENT OFFICE.

HADLEY C. REAMES, OF LOS ANGELES, CALIFORNIA, ASSIGNOR OF ONE-HALF TO GEORGE H. REAMES, OF LOS ANGELES, CALIFORNIA.

PNEUMATIC PUMP.

868,939.   Specification of Letters Patent.   Patented Oct. 22, 1907.

Application filed September 20, 1906. Serial No. 335,340.

*To all whom it may concern:*

Be it known that I, HADLEY C. REAMES, a citizen of the United States, residing at Los Angeles, in the county of Los Angeles and State of California, have invented new and useful Improvements in Pneumatic Pumps, of which the following is a specification.

My invention relates to means for automatically supplying air to pneumatically tired vehicle wheels, and an object thereof is to provide a device that may be permanently attached to a pneumatically tired vehicle wheel and which will be operated by the rotation of the wheel to which it is secured.

A further object is to provide a pump whereby when the tire is fully inflated that the pressure of the air contained therein will automatically operate mechanism to temporarily render the pumping mechanism inoperative.

I accomplish these objects by means of the device described herein and illustrated in the accompanying drawings in which:—

Figure 1.—is an elevation of a portion of a pneumatically tired vehicle wheel with my improved pump secured thereto. Fig. 2.—is a section taken on line 2—2 of Fig. 1. Fig. 3.—is a central vertical section of my improved pump. Fig. 4.—is a detail of the pump operating mechanism partly in section.

Heretofore considerable difficulty has been experienced in keeping pneumatic tires fully inflated because of the constant leakage of air from the valves and rims, thus necessitating constant attention to keep them fully inflated. In automobiling the necessity of fully inflated tires is recognized, as dangerous accidents are often caused by the tires becoming flat, owing to the constant leakage of air therefrom. By the use of my improved automatic pumping device all danger arising from partially deflated tires is eliminated, as the constant leakage is provided for, the pump working automatically and renewing the air supply the moment a leakage occurs.

Referring to the drawings 5 designates the hub of a pneumatically tired vehicle wheel, 6 the spokes, 7 the rim and 8 the pneumatic tire secured thereto. The rim has the usual air inlet tube 9 which communicates with the inner tube 10. Rigidly secured to the under side of the rim 7 by clamp 11 is a cylinder 12 which has in its upper end an air inlet port 13, in which is mounted an automatic inlet valve 14 of well known construction. The outer end of this air inlet passage is enlarged and threaded for the reception of the threaded end of the inlet tube 9. The inner end of the cylinder is threaded for the reception of a bifurcated frame 15 in which is movably mounted a piston rod 16 bifurcated on its outer end, the inner end being secured to piston 17 of usual construction. In the bifurcated end of rod 16 is rotatively mounted a roller 18 that is adapted to engage a circular slot 19 in a cam 20 rigidly secured to an operating shaft 21 mounted in the bifurcated arms of the frame 15. On one end of shaft 21 is rigidly secured an operating arm 22. When in its normal position this operating arm is vertical and is held in which position by means of coiled springs 23 and 24. One end of spring 23 is secured to one of the arms of the frame 15 and is coiled around the shaft, its outer end bearing against the operating arm 22. One end of the spring 24 is secured to one of the arms of the frame 15, and is coiled around the shaft, the outer end of it being secured to the shaft 21. The spring 24 pulls in an opposite direction to spring 23 thus keeping the operating shaft in a vertical position.

Rigidly secured to steering knuckle 25 by bolt 26 and adapted to move therewith is a vertical arm 27, which has an adjusting slot 28 in which is mounted a roller contact 29. This roller contact lies directly in a plane with the operating arm 22, which arm is adapted to contact with roller 29 on the rotation of the wheel and operate the pumping mechanism hereinbefore described.

Secured to the side of cylinder 12 and preferably formed integral therewith is an auxiliary cylinder 30 which contains the mechanism for temporarily rendering the pumping mechanism inoperative. Mounted in this auxiliary cylinder is a piston 31 which has on its upper end a leather washer 32. Piston 31 has a cylindrical opening 33 into which projects pin 34 which has a shoulder 35 to limit the downward movement of the piston 31, a coiled spring 36 supporting the piston in its normal position, as best shown in Fig. 3. Secured in the cylinder 30 and at one side of pin 34 by a pin 37 extending transversely through the lower end thereof, is a spring catch 38 whose upper end is inclined and is adapted to be engaged by the beveled edge 39 of the piston 31, a slot 40 in the wall of cylinder 12 provides an opening through which the end of the spring catch may project when forced by the downward movement of piston 31. The upper end of cylinder 30 is closed by a screw plug 41. This screw plug has a stop 42 secured to its under side to limit the upward movement of the piston 31. A port 43 connects cylinder 30 with the upper end of port 13 directly above the air inlet valve 14, thus affording direct communication from the inlet tube to the upper end of the cylinder 30.

The operation of my device is as follows: On the movement of the vehicle the operating arm 22 comes in contact with the roller 29 forcing it downwardly and carrying therewith cam 20 mounted on shaft 21. The movement of this cam in either direction forces the piston upwardly and air through the inlet valve 14 to the inner tube of the tire, the springs 23 and 24 immediately returning the operating arm after it has contacted with the roller to its normal position. When the tire has become fully inflated the pressure of the air contained in the tire is sufficient to overcome the tension of spring 36 and force the piston 31 downwardly until the end of the spring catch is forced into the cylinder 12 and engages the under side of piston 17, thus automatically locking and holding the operating arm 22 in its inoperative position so that it will not engage the roller contact 29 secured to arm 27 on the further rotation of the wheel. When the tire has again become sufficiently deflated so that the pressure against piston 31 is removed, the piston 17 will be released by catch 38, thus automatically rendering the pumping mechanism operative. When it is desired to deflate the tire for the purpose of taking it off plug 41 is removed, thus releasing the air from the tire by way of passage 43.

It will thus be seen that I have produced a device whereby all danger arising from partially deflated tires is eliminated, as the device will continually force air into the tire, to replace that which escapes therefrom.

Having described my invention what I claim as new and desire to secure by Letters Patent is:—

1. A pneumatic pumping mechanism for a vehicle tire, comprising a cylinder rigidly secured to the rim of the vehicle wheel; an air inlet valve operatively mounted in the outer end of said cylinder and in communication with the tire on said wheel; a piston in said cylinder provided with a piston rod; means attached to the frame of said vehicle adapted to reciprocate said piston rod upon the rotation of the vehicle wheel; an auxiliary cylinder secured to said first named cylinder having an open port in communication with the tire on said wheel; a spring pressed piston in said auxiliary cylinder adapted to be moved inwardly against the spring pressure by the air pressure in said tire; and a spring catch mounted in said auxiliary cylinder adapted to be pressed into the first named cylinder by the inward movement of the piston in said auxiliary cylinder.

2. In a device of the class described, a pneumatically tired vehicle wheel operatively mounted on a vehicle, in combination with a cylinder rigidly secured to the rim of said wheel; an air inlet valve operatively mounted in the outer end of said cylinder and in communication with the tire on said wheel; a piston in said cylinder; a bifurcated piston rod having a roller in its furcations connected to said piston; a bifurcated frame secured to said cylinder; a cam rigidly secured to a shaft revolubly mounted in said frame adapted to engage the roller rotatively mounted on the piston rod; an operating arm secured to said shaft; means for returning the operating arm to its normal position; and an adjustable roller contact attached to an arm rigidly secured to the vehicle, said operating arm adapted to engage the said roller contact on the movement of the wheel.

3. A pneumatic pumping mechanism, comprising a pneumatically tired vehicle wheel operatively mounted on a vehicle, in combination with a cylinder rigidly secured to the rim of said wheel; an air inlet valve operatively mounted in the outer end of said cylinder and in communication with the tire on said wheel; a piston in said cylinder; a bifurcated piston rod having a roller in its furcations secured to said piston; a bifurcated frame secured to said cylinder; a cam rigidly secured to a shaft revolubly mounted in said frame and adapted to engage the roller revolubly mounted on the piston rod; an operating arm rigidly secured to said shaft; means secured to the shaft and to the frame for returning the operating arm to its normal position; an adjustable roller contact attached to an arm rigidly secured to the vehicle, said operating arm adapted to engage with and be operated by said roller contact on the movement of the wheel; an auxiliary cylinder secured to said first named cylinder having a port in communication with the tire on said wheel; a spring supported pneumatically operated piston mounted in said auxiliary cylinder; and a spring catch mounted in said auxiliary cylinder adapted to project into the first named cylinder on the inward movement of the spring supported piston, said catch adapted to automatically lock and hold the piston in the first named cylinder in an inoperative position when the vehicle tire is fully inflated.

4. A pneumatic pumping mechanism, comprising a pneumatically tired vehicle wheel operatively mounted on a vehicle, in combination with a cylinder rigidly secured to the rim of said wheel; an air inlet valve operatively mounted in the outer end of said cylinder and in communication with the tire on said wheel; a piston in said cylinder; a bifurcated piston rod having a roller in its furcations secured to said piston; a bifurcated frame secured to said cylinder; a cam rigidly secured to a shaft revolubly mounted in said frame and adapted to engage the roller revolubly mounted on the piston rod; an operating arm rigidly secured to said shaft; means secured to the shaft and to the frame for returning the operating arm to its normal position; an adjustable roller contact attached to an arm rigidly secured to the vehicle, said operating arm adapted to engage with and be operated by said roller contact on the movement of the wheel; an auxiliary cylinder secured to said first named cylinder having a port in communication with the tire on said wheel; a spring supported pneumatically operated piston mounted in said auxiliary cylinder; and a spring catch mounted in said auxiliary cylinder adapted to project into the first named cylinder on the inward movement of the spring supported piston, said catch adapted to automatically lock and hold the piston in the first named cylinder in an inoperative position when the vehicle tire is fully inflated, and to automatically release said piston when the tire becomes partially deflated.

5. In a device of the class described, a pneumatically tired vehicle wheel operatively mounted on a vehicle, in combination with a cylinder rigidly secured to the rim of said wheel; an air inlet valve operatively mounted in the outer end of said cylinder and in communication with the tire on said wheel; a piston in said cylinder; a bifurcated piston rod having a roller in its furcations connected to said piston; a bifurcated frame secured to said cylinder; a cam rigidly mounted on a shaft revolubly mounted in said frame adapted to engage the roller revolubly mounted on the piston rod; an operating arm secured to said shaft; means for returning the operating arm to its normal position; pneumatically operated locking mechanism secured to said cylinder and in communication with the interior thereof, said mechanism adapted to engage and hold said piston in an inoperative position when the vehicle tire is fully inflated and to release said piston when the tire becomes partially deflated; and an adjustable roller contact attached to an arm rigidly secured to the vehicle, said operating arm adapted to engage the said roller contact on the movement of the wheel.

In witness that I claim the foregoing I have hereunto subscribed my name this 11th day of September, 1906.

HADLEY C. REAMES.

Witnesses:
EDMUND A. STRAUSE,
M. A. JONES.